Nov. 17, 1931.  A. GROOP  1,832,546
QUACK GRASS ERADICATOR
Filed March 5, 1931  5 Sheets-Sheet 4
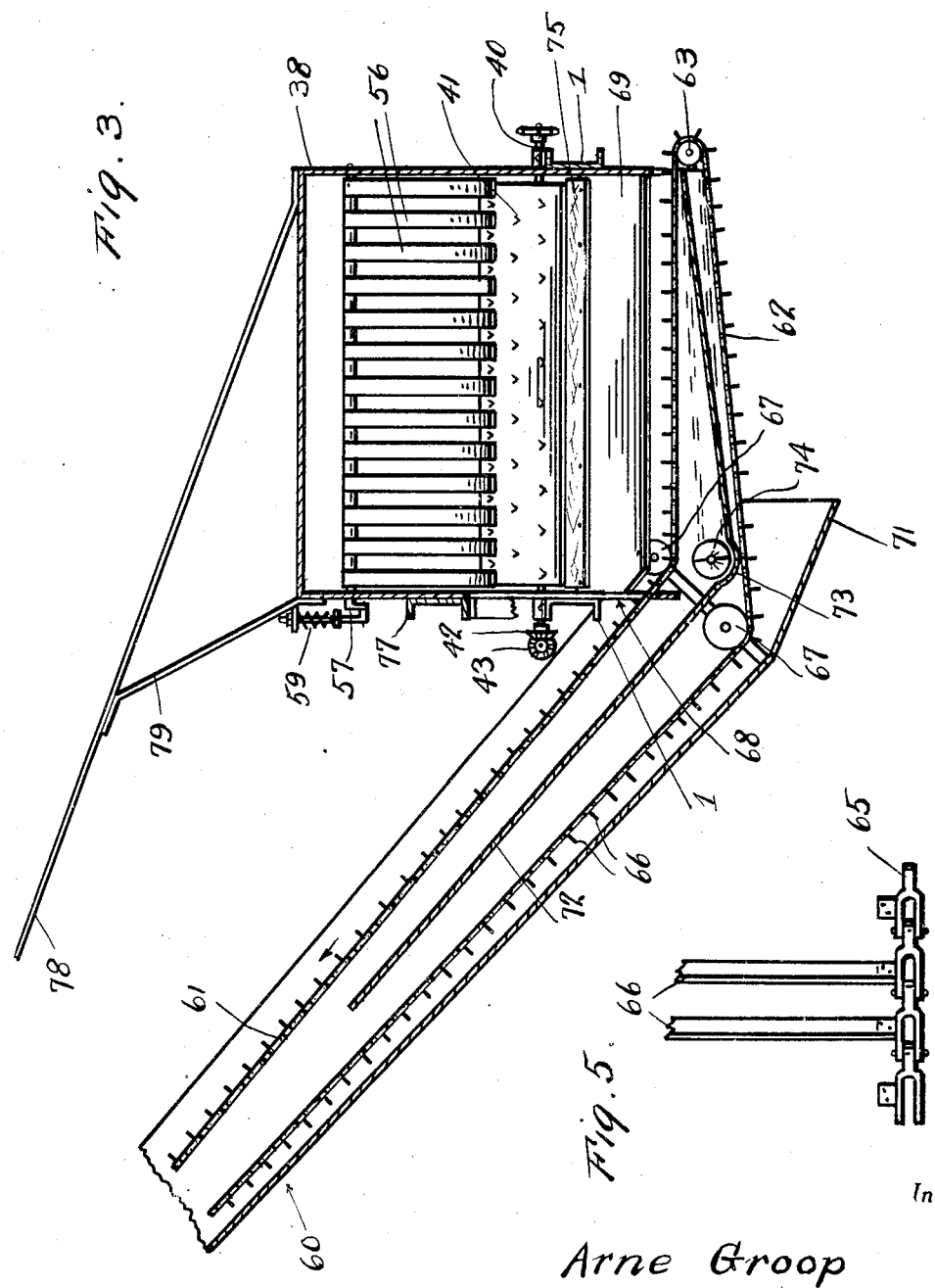
Inventor
*Arne Groop*
By *Clarence A. O'Brien*
Attorney

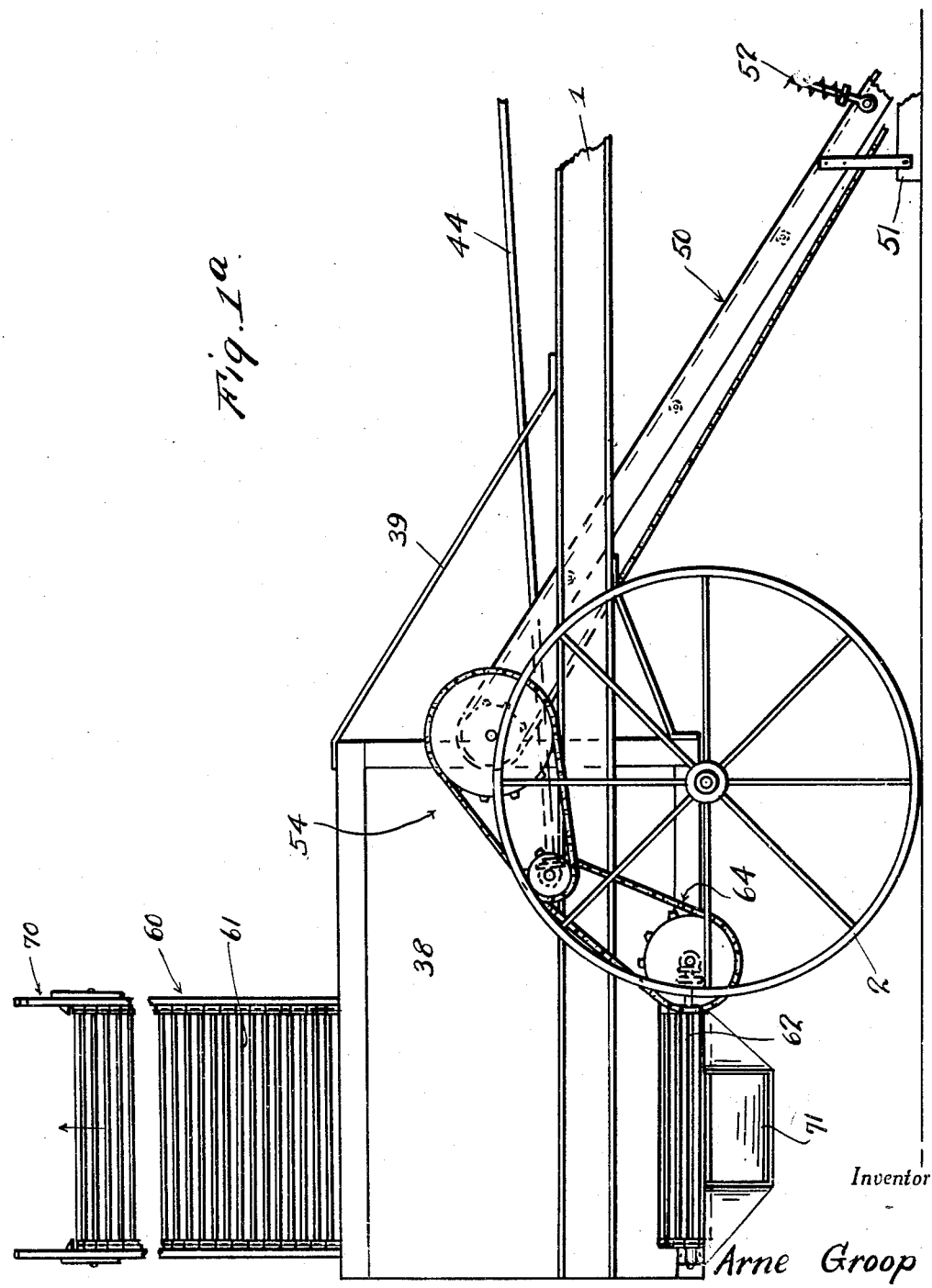

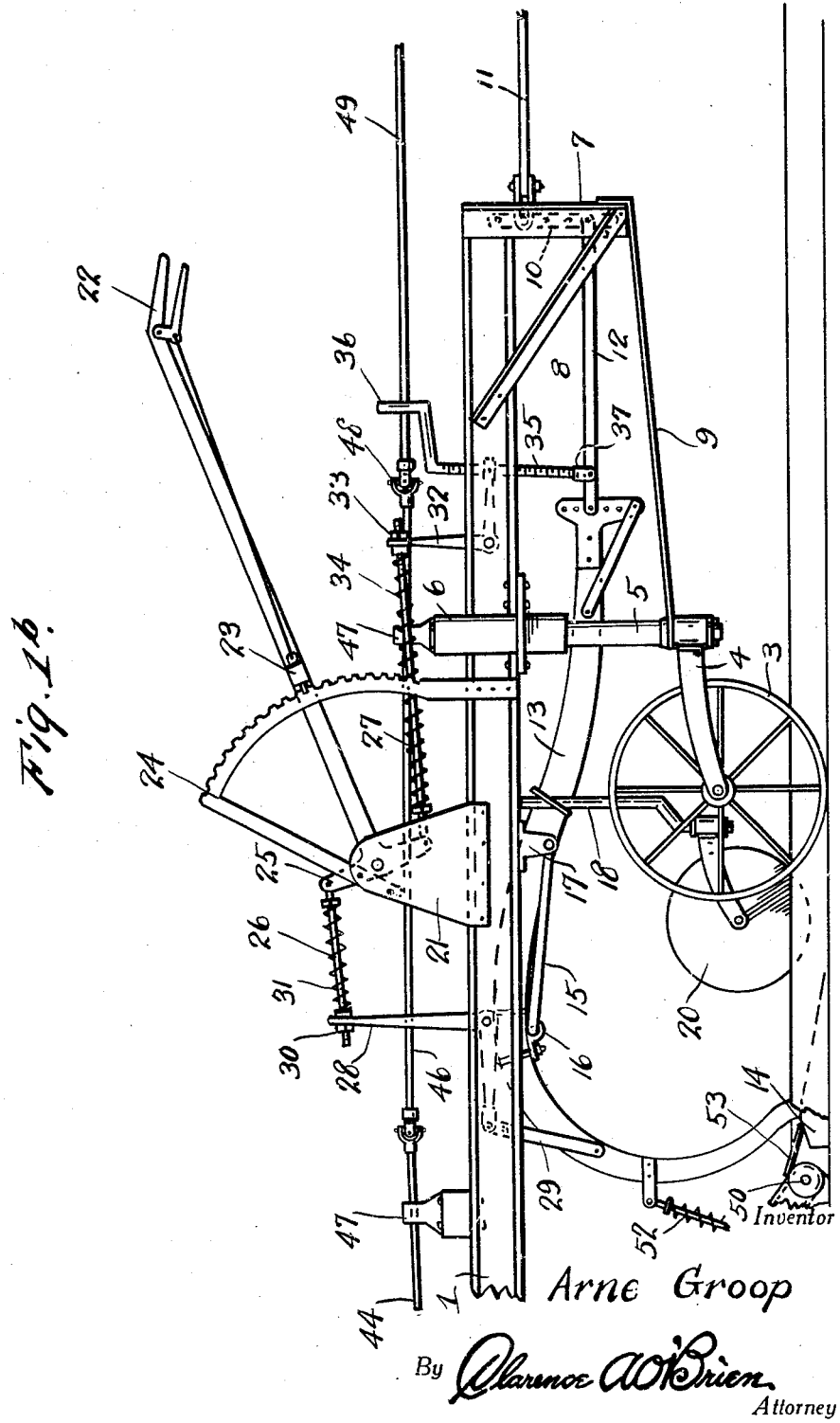

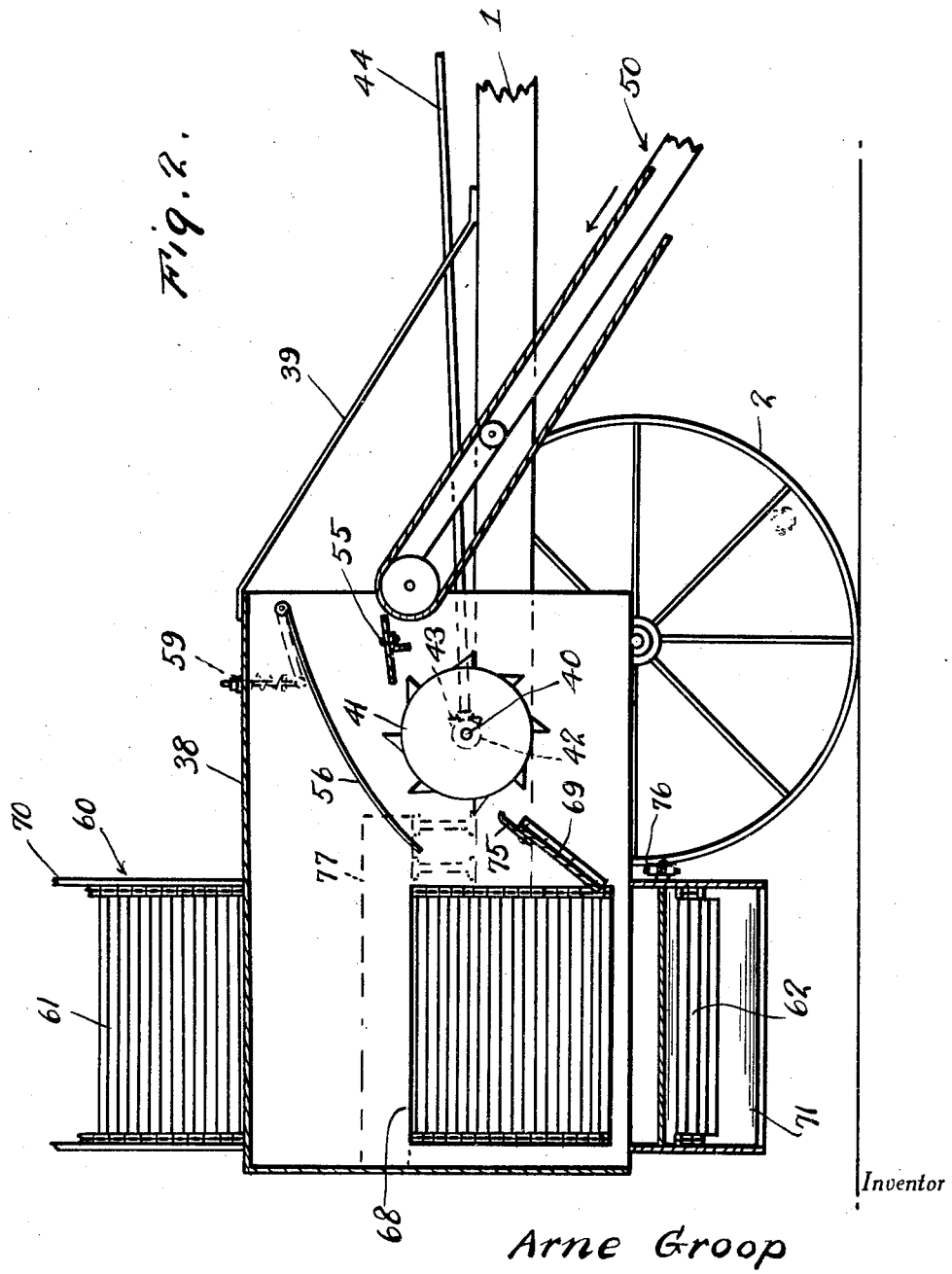

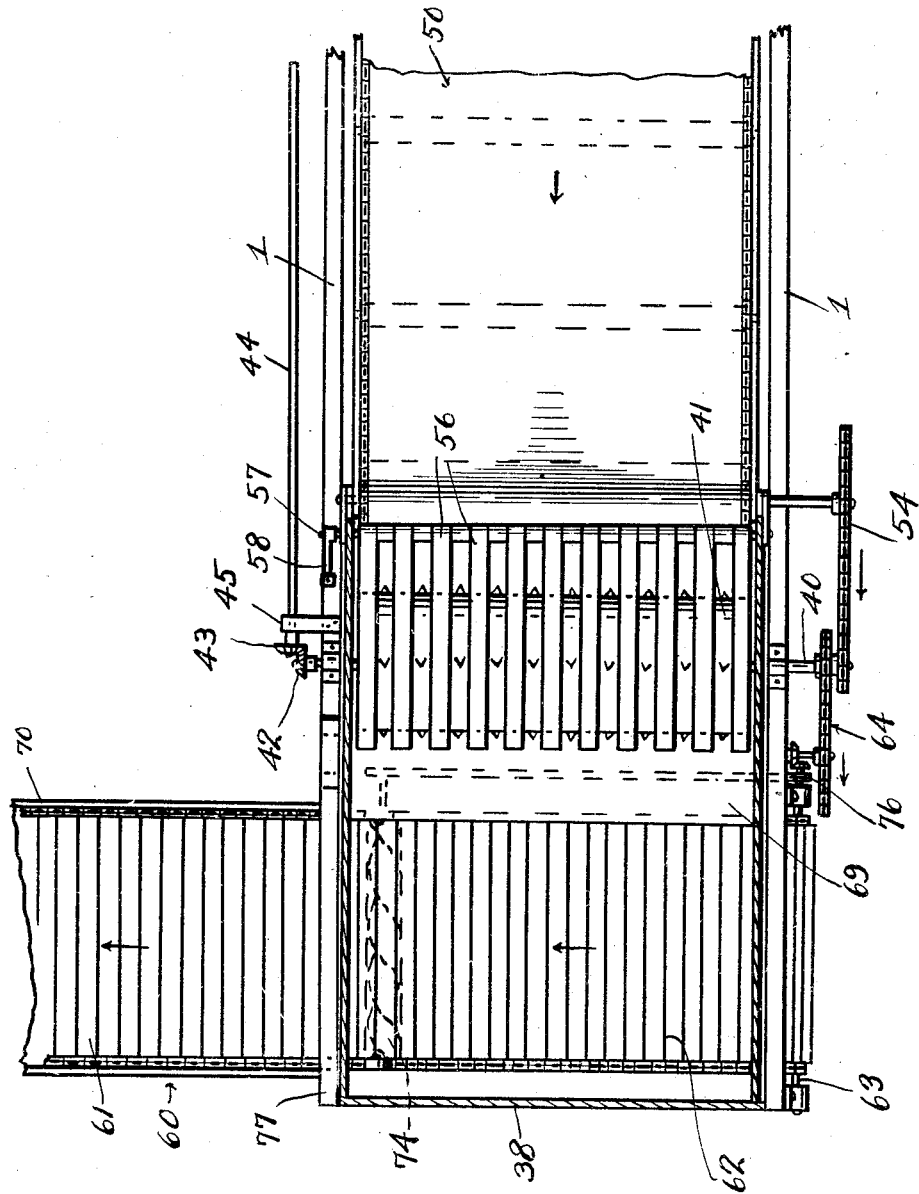

Patented Nov. 17, 1931

1,832,546

UNITED STATES PATENT OFFICE

ARNE GROOP, OF FREDERICK, SOUTH DAKOTA

QUACK GRASS ERADICATOR

Application filed March 5, 1931. Serial No. 520,362.

This invention relates to a quack grass eradicator and has for one of its important objects to provide, in a manner as hereinafter set forth, a device of this character embodying a novel construction and arrangement of parts for digging or plowing the quack grass out of the ground, removing the dirt therefrom and then depositing the quack grass in a wagon or other vehicle and returning the dirt to the furrow or trench which is left by the plow.

Another important object of the invention is to provide a quack grass eradicator of the character described embodying novel means for manually adjusting the plow vertically and for regulating the angularity of said plow relative to the ground.

Other objects of the invention are to provide a quack grass eradicator of the character set forth which will be simple in construction, strong, durable, efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1a is a view in side elevation showing the rear portion of the machine.

Figure 1b is a view in side elevation showing the front portion of the machine.

Figure 2 is a view in vertical longitudinal section through the rear portion of the machine.

Figure 3 is a view in vertical cross section through the rear portion of the machine.

Figure 4 is a view in horizontal section through the rear portion of the machine.

Figure 5 is a fragmentary view in top plan of a portion of the separating conveyor.

Referring to the drawings in detail, it will be seen that the reference numeral 1 designates a frame of suitable construction having its rear portion supported on the wheels 2 and its forward end supported on the caster wheels 3. The caster wheels 3 are journaled on the arms 4 which are mounted for swinging movement on the lower end portions of the shafts 5 having their upper portions rotatably disposed in the sleeves 6 which, in turn, are rigidly mounted on the side members of the frame 1. The frame 1 further includes a substantially U-shaped portion 7 which depends from the forward end of said frame 1 and is provided with the braces 8 which extend to the side members of the frame 1. Struts 9 extend from the depending frame portion 7 to the lower portions of the shafts 5 for bracing said shafts 5 in an obvious manner.

A link 10 is pivotally suspended from the forward end of the frame 1 within the depending portion 7 and is provided with a series of spaced openings for adjustably connecting a draft bar 11 thereto. A plow draw bar 12 has its forward end pivotally and adjustably connected to the lower portion of the link 10 and has its rear end pivotally and adjustably connected to the forward end of the plow beam 13 upon the rear end of which is mounted a plow 14. The plow beam 13 is mounted for swinging movement on the frame 1 through the medium of a substantially U-shaped rod 15 having an intermediate portion rotatably connected to an intermediate portion of the plow beam 13, as at 16, the rod 15 having trunnions on its ends journaled in the bearings 17 which depend from the frame 1. A shank 18 is secured to an intermediate portion of the plow beam 13 and depends therefrom, said shank having mounted for swinging movement in a horizontal plane on its lower end portion a yoke 19 in which a ground engaging disc 20 is journaled, said disc 20 being disposed forwardly of the plow 14.

An upstanding plate 21 is rigidly mounted on the frame 1 and pivotally supports a hand lever 22 having a detent 23 mounted thereon for engagement with the toothed segment 24 for releasably retaining the lever 22 in adjusted position, as will be obvious. One end of the segment 24 is supported on the plate 21 and the other end of said segment is supported on the frame 1. At its lower end the lever 22 terminates in a T-head 25 to one end of which a rod 26 is pivotally connected and to the other end of which one end of a rod 27 is pivotally connected. A bell crank lever 28 is mounted for swinging movement in a vertical plane on the frame 1 and has one end operatively connected to the plow beam 13 through the medium of a link 29. The rod 26 extends slidably through the other end portion of the bell crank lever 28 and has threaded thereon a stop nut 30 for engagement with the bell crank lever, as will be apparent. A coil spring 31 is mounted on the rod 26 and yieldingly urges the bell crank lever 28 against the stop nut 30.

A bell crank lever 32 is mounted for swinging movement in a vertical plane on the frame 1 forwardly of the bell crank lever 28 and the rod 27 extends slidably through one end portion of the bell crank lever 32. A stop nut 33 is threaded on the forward end portion of the rod 27 for engagement with the bell crank lever 32. A coil spring 34 is mounted on the rod 27 and is operatively engaged with the bell crank lever 32 for yieldingly urging the same against the stop nut 33. It will be noted that the bell crank levers 28 and 32 are reversely disposed relative to each other. The other end of the bell crank lever 32 is operatively connected to an adjusting screw 35 having an actuating crank 36 formed integrally with its upper end. The lower end of the adjusting screw 35 is rotatably connected to a clevis 37 which, in turn, is pivotally connected to a rear portion of the plow draw bar 12.

A housing 38 is mounted on the rear portion of the frame 1, said housing being open at its front, as illustrated to advantage in Figure 2 of the drawings. Braces 39 extend from the top of the housing 38 to the side members of the frame 1. A horizontally disposed shaft 40 is journaled in bearings provided therefor on the side members of the frame 1 and said shaft 40 extends rotatably through a forward portion of the housing 38 and has fixed thereon for rotation in the housing a toothed drum 41. The ends of the shaft 40 project outwardly from the side members of the frame 1 and a beveled gear 42 is fixed on one end portion of the shaft 40 and meshes with a beveled gear 43 which is fixed on the rear end portion of a drive shaft 44 which is journaled in the bearings 45 which are provided therefor on one of the side members of the frame 1. The drive shaft 44 has connected thereto an extension 46 through the medium of a universal joint 47 which is also rotatably supported in bearings on the frame 1. A universal joint 48 operatively connects the extension shaft 46 to the rear end of a power take-off shaft 49 which extends rearwardly from the tractor (not shown) to which the draft bar 11 is connected.

An endless conveyor 50 is supported in any suitable manner on the frame 1 and has its lower forward end disposed immediately behind the plow 14 and provided with the ground engaging skids 51. Links 52 connect the forward end of the conveyor 50 with the plow beam 13 for raising and lowering said forward end of the conveyor with the plow. A plate 53 is mounted on the rear portion of the plow 14 and bridges the space between said plow 14 and the forward end of the conveyor 50 to insure the passage of the quack grass and the dirt from the plow on to the conveyor.

The rear or upper end of the conveyor 50 is disposed in the forward end portion of the housing 38 above the horizontal plane of the toothed drum 41 and is operatively connected to the shaft 40 for actuation thereby through the medium of a chain and sprocket connection 54. A transversely extending, inclined plate 55 is mounted in the housing 38 between the upper end of the conveyor 50 and the toothed drum 41 for conveying the material to said toothed drum 41 which is discharged from the conveyor 50. Fingers 56 are disposed in a rearwardly inclined position in the housing 38 above the toothed drum 41, said fingers being fixed on a transverse shaft 57 having an arm 58 fixed on one end portion thereof to which resilient means 59 is operatively connected in a manner to normally maintain the fingers 56 in spaced relation to the drum 41 but to permit said fingers to be swung away from the drum 41 when sufficient pressure is exerted thereon.

The reference numeral 60 designates generally a separating conveyor which is mounted on the rear portion of the machine and which comprises an inclined portion 61 and a horizontal portion 62 which extends transversely beneath the rear portion of the housing 38. It may be well to here state that the housing 38 is open at its bottom as well as at its front. The lower end of the separating conveyor 60 is provided with a drive roller 63 which is operatively connected to the shaft 40 for actuation thereby through the medium of the gear and chain and sprocket connection which is designated generally by the reference numeral 64 and best illustrated in Figure 4 of the drawings. The separating conveyor 60 comprises a pair of endless side chains 65 between which extend the spaced, parallel, angle iron slats or bars 66 (see Figure 5). The side chains of the upper and lower flights of the conveyor travel under the pulley wheels 67 disposed beneath one side of the housing 38. The upper flight of the conveyor 60 travels through an opening or window 68 provided therefor in said one side of the housing 38. An inclined chute 69 (see Figure 2) is mounted transversely in the housing 38 between the toothed drum 41 and the horizontal portion 62 of the conveyor 60 for directing material from the drum 41 on the said horizontal portion 62.

The separating conveyor 60 further includes a casing 70 of substantially U-shaped cross section in which the inclined portion 61 is operable. The upper side of the casing 70 is open. At its lower end the casing 70 terminates in a discharge chute or trough 71 the outlet end of which is disposed beneath the horizontal portion 62 of the conveyor 60. A pan 72 is mounted between the upper and lower flights of the conveyor 60 and is provided with inclined portions extending between the flights of the portions 61 and 62 of the conveyor 60. An intermediate portion of the pan 72 is formed to provide a trough 73 in which is operable a screw conveyor 74. In Figure 2 of the drawings the reference numeral 75 designates a flexible extension on the upper end of the chute 69. The screw conveyor 74 is operatively connected by a chain and sprocket connection 76 to the drive means 64 which actuates the separating conveyor 60. The side member of the frame 1 which is disposed on the side of the housing 38 in which the opening 68 is provided terminates at the forward side of said opening 68 and has secured thereto an upwardly offset extension 77 which projects rearwardly over the opening 68 for supporting the rear portion of that side of the housing 38. In Figure 3 of the drawings the reference numeral 78 designates a strut which extends from the top of the housing 38 to the upper end of the separating conveyor 60. Two of the struts 78 are, of course, provided, one for each side of the conveyor 60 and braces 79 extend between intermediate portions of the struts 78 and the adjacent upper portion of the housing 38. In use, the disc 20 runs ahead of the plow 14 and loosens the surface of the ground. The plow 14 travels at the desired depth and lifts the quack grass with the roots thereof out of the ground. The quack grass is caused to travel rearwardly over the bridge plate 53 on to the conveyor 50 by reason of the forward movement of the machine. The quack grass is discharged from the upper end of the conveyor 50 on to the rotating toothed drum 41 over the inclined plate 55 and the toothed drum 41 removes most of the dirt from the roots of the quack grass. The quack grass and dirt are then directed by the chute 69 on to the horizontal portion 62 of the separating conveyor 60 which carries the quack grass and its roots outwardly and upwardly and discharges the same into a wagon or other vehicle (not shown) which accompanies the machine. The dirt which is shaken from the roots of the quack grass passes between the angle iron cross bars 66 of the upper flight of the separating conveyor 60 on to the pan 72 and gravitates to the trough 73. The screw conveyor 74 moves the dirt rearwardly in the trough 73 and discharges said dirt over the rear edge of the pan 72 into the mouth or chute 71 from which the dirt drops by gravity into the furrow or trench left by the plow 14. The guard fingers 56 prevent the material from being thrown upwardly in the housing 38 by the rotating toothed drum 41. As before stated, the guard fingers 56 may be swung upwardly under pressure to permit the passage of material over the drum 41.

The connection 52 between the lower end of the conveyor 50 and the plow beam 13 is such as to permit independent upward swinging movement of the conveyor in order that said conveyor may ride over obstructions which it may encounter, such as rocks. The angle of the plow 14 in the ground may be expeditiously regulated by actuating the adjusting screw 35 through the medium of crank 36 in a manner to raise or lower the forward end of the plow beam 13. The plow 14 may be raised or lowered in a vertical plane relative to the ground through the medium of the hand lever 22. When the hand lever 22 is swung downwardly the bell crank levers 28 and 32 are swung in opposite directions to raise the plow beam 13 and when the hand lever 22 is swung upwardly the plow beam 13 is, of course, lowered. The sliding connections of the bell crank levers 28 and 32 with the rods 26 and 27, respectively, permit the plow 14 to ride over obstructions, such as rocks without actuating the hand lever 22. The pivotal connection of the plow draw bar 12 with the swinging link 10 permits the plow beam 13 to travel in an arc on the rod 15 when being raised or lowered. The disc 20 is raised and lowered with the plow beam 13 as will be readily apparent. The caster wheels 3 which support the forward end of the machine permit said machine to follow the tractor when making a turn.

It is believed that the many advantages of a quack grass eradicator constructed in accordance with this invention will be readily understood, and although the preferred embodiment of the invention is as illustrated and described, it is to be understood that changes in the details of construction may be had which will fall within the scope of the invention as claimed.

What is claimed is:—

1. A quack grass eradicator of the character described comprising, in combination, a wheeled frame, a housing mounted on the frame, a plow mounted on the frame forwardly of the housing, said plow being operable beneath the surface of the ground for lifting the quack grass therefrom, an endless conveyor disposed between the housing and the plow for receiving the quack grass from said plow and discharging said quack grass into the housing, and means for removing dirt from the quack grass and depositing said dirt in the furrow left by the plow, said means comprising an endless conveyor including an inclined portion and a substantially horizontal portion extending beneath the housing, said housing being open at its bottom, the second named endless conveyor further including a pair of endless side chains and spaced cross bars extending therebetween, a casing disposed about the inclined portion of the second named conveyor, a discharge chute on the lower end of the casing, a pan disposed between the upper and lower flights of the second named conveyor, a trough in the pan disposed above the discharge chute, a screw conveyor operable in the trough, the portions of the pan on opposite sides of the trough being inclined toward said trough, and means for depositing the quack grass on the horizontal portion of the second named conveyor from the discharge end of the first named conveyor, the dirt dropping from the quack grass through the bars of the second named conveyor on to the pan and gravitating to the trough and the screw conveyor discharging the dirt from the trough into the discharge chute, said discharge chute being disposed above the furrow left by the plow in a manner to deposit the dirt therein.

2. A quack grass eradicator of the character described comprising, in combination, a wheeled frame, a housing mounted on the frame, a plow mounted on the frame forwardly of the housing, said plow being operable beneath the surface of the ground for lifting the quack grass therefrom, an endless conveyor disposed between the housing and the plow for receiving the quack grass from said plow and discharging said quack grass into the housing, and means for removing dirt from the quack grass and depositing said dirt in the furrow left by the plow, said means comprising an endless conveyor including an inclined portion and a substantially horizontal portion extending beneath the housing, said housing being open at its bottom, the second named endless conveyor further including a pair of endless side chains and spaced cross bars extending therebetween, a casing disposed about the inclined portion of the second named conveyor, a discharge chute on the lower end of the casing, a pan disposed between the upper and lower flights of the second named conveyor, a trough in the pan disposed above the discharge chute, a screw conveyor operable in the trough, the portions of the pan on opposite sides of the trough being inclined toward said trough, and means for depositing the quack grass on the horizontal portion of the second named conveyor from the discharge end of the first named conveyor, the dirt dropping from the quack grass through the bars of the second named conveyor on to the pan and gravitating to the trough and the screw conveyor discharging the dirt from the trough into the discharge chute, said discharge chute being disposed above the furrow left by the plow in a manner to deposit the dirt therein, the means for depositing the quack grass on the second named conveyor from the first named conveyor comprising a toothed rotary drum mounted in the housing adjacent the first named conveyor, an inclined plate mounted in the housing and extending between the first named conveyor and the toothed drum, and an inclined chute disposed in the housing between the toothed drum and the horizontal portion of the second named conveyor and adapted to receive the quack grass from the drum.

3. A quack grass eradicator of the character described comprising, in combination, a wheeled frame, a housing mounted on the frame, a plow mounted on the frame forwardly of the housing, said plow being operable beneath the surface of the ground for lifting the quack grass therefrom, an endless conveyor disposed between the housing and the plow for receiving the quack grass from said plow and discharging said quack grass into the housing, and means for removing dirt from the quack grass and depositing said dirt in the furrow left by the plow, said means comprising an endless conveyor including an inclined portion and a substantially horizontal portion extending beneath the housing, said housing being open at its bottom, the second named endless conveyor further including a pair of endless side chains and spaced cross bars extending therebetween, a casing disposed about the inclined portion of the second named conveyor, a discharge chute on the lower end of the casing, a pan disposed between the upper and lower flights of the second named conveyor, a trough in the pan disposed above the discharge chute, a screw conveyor operable in the trough, the portions of the pan on opposite sides of the trough being inclined toward said trough, and means for depositing the quack grass on the horizontal portion of the second named conveyor from the discharge end of the first named conveyor, the dirt dropping from the quack grass through the bars of the second named conveyor on to the pan and gravitating to the trough and the screw conveyor discharging the dirt from the trough into the discharge chute, said discharge chute being disposed above the furrow left by the plow in a manner to deposit the dirt therein, the means for depositing the quack grass on the second named conveyor from the first named conveyor comprising a toothed rotary drum mounted in the housing adjacent the first named conveyor, an inclined plate mounted in the housing and extending between the first named conveyor and the toothed drum, and an inclined chute disposed in the housing between the toothed drum and the horizontal portion of the second named conveyor and adapted to receive the quack grass from the drum, and a plurality of spaced, parallel, resilient fingers disposed for swinging movement above the drum for preventing the quack grass from being thrown upwardly by the drum.

4. A quack grass eradicator of the character described comprising, in combination, a wheeled frame, a plow beam, a plow mounted on one end of the beam, said plow being operable beneath the surface of the ground for lifting the quack grass therefrom, and means for adjustably mounting the plow beam on the wheeled frame, said means including a substantially U-shaped rod having an intermediate portion rotatably connected to an intermediate portion of the plow beam and having its end portions journaled to the wheeled frame, a pair of bell crank levers pivotally mounted for swinging movement in a vertical plane on the wheeled frame, said bell crank levers being reversely disposed with respect to each other, means operatively connecting the bell crank levers to spaced points of the plow beam, and manually operable means for actuating the bell crank levers in opposite directions simultaneously, the last named means comprising a lever having one end pivotally mounted on the wheeled frame, a T-head on said one end of the lever, rods pivotally connected to the end portions of the T-head and extending in opposite directions therefrom, said rods being operatively connected to the bell crank levers, an endless conveyor operatively mounted on the wheeled frame and having one end disposed adjacent the plow for receiving the quack grass therefrom, means mounted on the frame for removing dirt from the quack grass and returning said dirt to the furrow left by the plow.

In testimony whereof I affix my signature.

ARNE GROOP.